(12) United States Patent
Okamura et al.

(10) Patent No.: US 6,334,476 B1
(45) Date of Patent: *Jan. 1, 2002

(54) PNEUMATIC TIRE

(75) Inventors: Nobuyuki Okamura; Masahiro Hojo, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,646

(22) Filed: Sep. 5, 1997

(30) Foreign Application Priority Data

Sep. 25, 1996 (JP) ............................................. 8-253203
Jul. 18, 1997 (JP) ............................................. 9-193791

(51) Int. Cl.$^7$ ................................................. B60C 1/00
(52) U.S. Cl. ........................ 152/525; 152/548; 152/564; 525/332.6; 525/332.8; 525/332.9; 525/333.1; 525/333.2; 525/341
(58) Field of Search ................................ 152/525, 548, 152/564

(56) References Cited

U.S. PATENT DOCUMENTS 3,554,857 A * 1/1971 Barton ........................ 525/341

FOREIGN PATENT DOCUMENTS

| DE | 159 69 200 | 8/1970 |
| EP | 0 864 604 | 9/1998 |
| FR | 2005019 | 12/1969 |
| FR | 2110151 | 5/1972 |
| GB | 1288616 | 9/1972 |
| JP | 52-40549 | 3/1977 |
| JP | 54-85243 | 7/1979 |

OTHER PUBLICATIONS

Chemical Abstract, vol. 89, No. 26, Dec. 25, 1978, XP 002049807.
Chemical Abstract, vol. 114, No. 6, Feb. 11, 1991, XP 002049808.
Rubber Chemistry and Technology, vol. 62, pp. 569–584 (Sep./Oct., 1989).

* cited by examiner

*Primary Examiner*—Bernard Lipman
(74) *Attorney, Agent, or Firm*—Sughrue Mion, PLLC

(57) ABSTRACT

A pneumatic tire comprising a tread, wherein the rubber composition of the tread layer comprises 50 parts by weight or more of SBR in 100 parts by weight of the rubber component and, in an amount of 0.2 to 5.0 parts by weight per 100 parts by weight of the rubber component, a vulcanization accelerator represented by the following general formula (I):

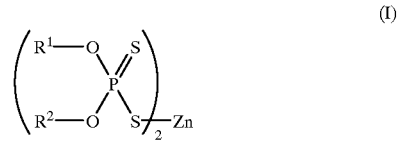

(I)

wherein $R^1$ and $R^2$ each independently represents an alkyl group having 1 to 10 carbon atoms which may be linear, branched, or cyclic or an aryl group having 6 to 10 carbon atoms. The pneumatic tire shows excellent controllability at high speed.

12 Claims, No Drawings

PNEUMATIC TIRE

BACKGROUND OF THE INVENTION

1. Field of the Invention

The present invention relates to a pneumatic tire, and more particularly, to a pneumatic tire showing excellent controllability at high speed (hereinafter, referred to as high speed controllability).

2. Description of Related Art

In recent years, it has become important that automobiles show higher speed performance due to the growing network of expressways. Therefore, excellent high speed controllability is required not only in sports car tires but also in tires of family cars.

As one of the methods to satisfy the requirement, tires having a radial structure, particularly low profile radial tires are used. The size of a low profile radial tire is different from the size of a conventional tire. Replacing a tire with another tire having a different size is restricted by the size of the tire house of the vehicle to which the tires are attached, in other words, by the design of the vehicle. Moreover, when an owner of a vehicle equipped with conventional tires replaces the conventional tires with low profile radial tires to obtain enhanced high speed controllability, the radius of the wheels is usually increased, and new wheels have to be bought. Therefore, a means of increasing high speed controllability with tires of the same size has been desired.

To solve the above problem, improvement in a rubber composition for tire tread has been attempted, and specific combinations of polymer, carbon black, and softener have been examined. However, satisfactory improvement in high speed controllability of tires has not been achieved. As for the case in which a vulcanizing agent and a vulcanization accelerator are particularly examined among components of rubber composition, a rubber composition is proposed in Japanese Patent Application Laid-Open No. (JPA) 52-40549, in which natural rubber or synthetic isoprene rubber is used as a rubber component, and a zinc dithiophosphate is used as a reversion inhibitor. However, this rubber composition is used for preventing reversion, and no description or suggest ion is found about tire performance. In JPA 54-85243, it is proposed that vulcanization in which no sulfur is used can be conducted by a rubber composition comprising (1) a derivative of benzothiazole and (2) a compound selected from a group consisting of zinc dithiophosphates, metal xanthates, and amine salts of dithiocarbamic acid in specific amounts relative to the amount of a diene rubber. However, this technology is not related to improvement in tire performance.

SUMMARY OF THE INVENTION

The present invention has been made in view of the above facts, and the object of the present invention is to provide a pneumatic tire having excellent high speed controllability.

The present inventors conducted extensive studies on polymers and various types of ingredients which are compounded into tread rubber, and found that by the following means the above object can be achieved and the present invention can be completed.

Accordingly, the present invention provides a pneumatic tire comprising a tread,
wherein the rubber composition of the tread layer comprises 50 parts by weight or more of SBR in 100 parts by weight of the rubber component and, in an amount of 0.2 to 5.0 parts by weight to 100 parts by weight of the rubber component, a vulcanization accelerator represented by the following general formula (I):

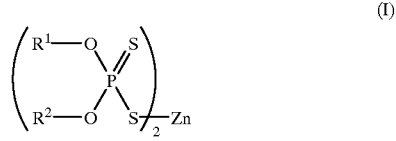

wherein $R^1$ and $R^2$ each independently represents an alkyl group having 1 to 10 carbon atoms which may be linear, branched, or cyclic or an aryl group having 6 to 10 carbon atoms.

DETAILED DESCRIPTION OF THE INVENTION

In the present invention, it is necessary that the rubber composition of the tread layer comprises 50 parts by weight or more, preferably 70 parts by weight or more, of SBR in 100 parts by weight of the rubber component. When the amount of SBR is less than 50 parts by weight, the property of gripping road surfaces which contributes to controllability is inferior, and such an amount is not preferable.

It is also preferable that the rubber composition comprises SBR in an amount such that the amount of the styrene units in the SBR contained in 100% by weight of the rubber component is 20% by weight or more. When the amount of the styrene units in the SBR contained in the rubber component is 20% by weight or more, hysteresis loss generated by the cohesive energy of styrene is increased, and the property of gripping road surfaces can be improved. For example, when 50 parts by weight of SBR is mixed with 50 parts by weight of natural rubber used as the other component of the rubber component, this means that the content of the styrene units in the SBR is 40% by weight or more.

In another embodiment, it is preferable that the rubber composition comprises SBR containing 30% by weight or more of styrene in 100 parts by weight of the rubber component. When SBR containing 30% by weight or more of styrene is comprised, the property of gripping road surfaces can be improved even when the content of the styrene unit in 100% by weight of the total rubber component is less than 20% by weight because SBR containing a large amount of styrene forms microscopic domains, and the hysteresis loss generated by the cohesive energy of styrene is increased. For example, when 10 parts by weight of SBR containing 35% by weight of styrene, 40 parts by weight of SBR containing 23.5% by weight of styrene, and 50 parts by weight of natural rubber used as the other component of the rubber component are mixed together, the obtained composition is also included in the preferred embodiment of the present invention although the content of the styrene units in 100% by weight of the obtained rubber component is less than 20% by weight.

An example of SBR used in the present invention may be, but is not limited to, commercially available emulsified polymerized SBR, solution polymerized SBR, and the like, so long as the SBR is satisfactory with regard to the above-mentioned requirements.

In the present invention, other types of SBR, natural rubber, and synthetic rubbers, such as isoprene rubber, butadiene rubber, butyl rubber (including halogenatedbutyl rubber), and ethylene-propylene rubber, can be used in the rubber component in combination with SBR specified in the present invention.

In the present invention, the rubber composition preferably comprises a softener in an amount of 20 parts by weight or more, more preferably 25 to 60 parts by weight for desired effects, to 100 parts by weight of the rubber component. When the amount of the softener is less than 20 parts by weight, the surface of the prepared rubber is too hard and cannot absorb the roughness of the road, and the property of gripping road surfaces is decreased. Therefore, such an amount is not preferable. An aromatic oil is preferably used as the softener. The aromatic oil is not particularly limited and can be selected from the many types of commercially available aromatic oils.

It is necessary that the rubber composition of at least one of the rubber cap layer and the rubber base layer in the tread layer composed of two layers, or the rubber composition of the tread layer composed of a single layer comprise 0.2 to 5.0 parts by weight, preferably 0.2 to 2.0 parts by weight, of the vulcanization accelerator represented by the above general formula (I) per 100 parts by weight of the rubber component. When the amount is less than 0.2 parts by weight, the effect of increasing high speed controllability is low. When the amount exceeds 5.0 parts by weight, no further increase in the effect is seen. Thus, any addition above 5.0 parts by weight is uneconomical.

In the following general formula (I) representing the vulcanization accelerator used in the present invention, i.e., a zinc dithiophosphate, $R^1$ and $R^2$ each independently represents an alkyl group having 1 to 10 carbon atoms which may be linear, branched, or cyclic or an aryl group having 6 to 10 carbon atoms.

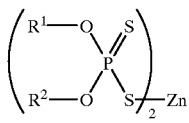

(I)

$R^1$ and $R^2$ each is preferably an alkyl group having 3 to 4 carbon atoms, such as the alkyl groups in the compounds expressed by the following formulae (II):

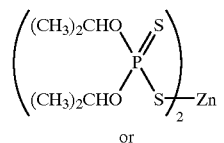

(II)

or

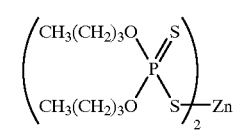

A zinc dithiophosphate having an alkyl group having 2 or less carbon atoms tends to show a decreased solubility to rubber. When a zinc dithiophosphate has an alkyl group having 5 or more carbon atoms, no further increase in the effect is seen. Thus, any alkyl group having more than 5 carbon atoms is uneconomical.

Examples of the vulcanization accelerator include zinc O,O'-dipropyldithiophosphate, zinc O,O'-diisopropyldithiophosphate, zinc O,O'-di-n-butyldithiophosphate, zinc O,O'-di-sec-butyldithiophosphate, zinc O,O'-di-t-butyldithiophosphate, zinc O,O'-diphenyldithiophosphate, and zinc O,O'-dicyclohexyldithiophosphate. Among these compounds, zinc O,O'-diisopropyldithiophosphate and zinc O,O'-di-n-butyldithiophosphate are preferable. The vulcanization accelerator can be used singly or as a mixture of two or more types.

In the rubber composition of the present invention, components generally used in rubber compositions for tires, such as carbon black, silica, zinc oxide, stearic acid, antioxidants, waxes, silane coupling agents, and vulcanizing agents, can suitably be comprised in combination with the above essential components within a range in which the effect of the present invention is not adversely affected.

Examples of the vulcanizing agent include sulfur and donors of sulfur, which can be added in an amount of sulfur of 0.5 to 5.0 parts by weight, preferably 1 to 2 parts by weight, to 100 parts by weight of the rubber component. When the amount is less than 0.5 parts by weight, the breakage strength and abrasion resistance of the vulcanized rubber decrease. When the amount exceeds 5 parts by weight, the rubber elasticity tends to be inferior.

The rubber composition used for the pneumatic tire of the present invention preferably comprises a vulcanization accelerator containing benzothiazole in addition to the vulcanization accelerator represented by general formula (I), and the molar amount of the unit of benzothiazole contained in the rubber composition is preferably half or more of the molar amount of the vulcanization accelerator represented by general formula (I). Examples of vulcanization accelerators containing a benzothiazole unit include mercaptobenzothiazoles, dibenzothiazolyl disulfides, benzothiazolylsulfenamides, and benthiazolylsulfenimides, and preferable examples include alkylated mercaptobenzothiazoles, bis(alkylated benzothiazolyl) disulfides, alkylated benzothiazolylsulfenamides and alkylated benzothiazolylsulfenimides. Specific examples of the vulcanization accelerator containing a benzothiazole unit include mercaptobenzothiazole, 4-methylmercaptobenzothiazole, 4-ethylmercaptobenzothiazole, 2,2'-dithiobismercaptobenzothiazole, 2,2'-dithiobis(4-methylmercaptobenzothiazole), 2,2'-dithiobis(4-ethylmercaptobenzothiazole) N-tert-butyl-2-benzothiazolylsulfenamide, N-tert-butyl-2-(4-methylbenzothiazolylsulfenamide), N-tert-butyl-2-(4-ethylbenzothiazolylsulfenamide), N-cyclohexyl-2-benzothiazolylsulfenamide, N-cyclohexyl-2-(4-methylbenzothiazolylsulfenamide) N-cyclohexyl-2-(4-ethylbenzothiazolylsulfenamide), N-tert-butyl-2-benzothiazolylsulfenimide, N-tert-butyl-2-(4-methylbenzothiazolylsulfenimide) N-tert-butyl-2-(4-ethylbenzothiazolylsulfenimide), N-cyclohexyl-2-benzothiazolylsulfenimide, N-cyclohexyl-2-(4-methylbenzothiazolylsulfenimide), and N-cyclohexyl-2-(4-ethylbenzothiazolylsulfenimide).

When the molar amount of the unit of benzothiazole in the rubber composition is less than half of the molar amount of the vulcanization accelerator represented by general formula (I), the vulcanization rate markedly decreases, and vulcanization must be conducted for a long time. Therefore, the productivity is decreased. Moreover, parts of a tire other than the tread part are over-cured because the vulcanization must be conducted for a long time, and physical properties of the rubber deteriorate.

Combined use of a dithiophosphoric acid type accelerator and a benzothiazole type accelerator is reported in Rubber Chemistry and Technology, Volume 62, Pages 569 to 584. According to this report, the optimum cure time is increased by the combined use, and this is opposite to the result of the present invention which is shown in the examples described below. The optimum cure time in the above report is considered to be increased because a dithiophosphoric acid base accelerator which is not a zinc salt and natural rubber are used. In contrast, a zinc salt of a dithiophosphoric acid and SBR are used in the present invention, and the optimum cure time is decreased.

The rubber composition in the present invention can be obtained by mixing the components using a mixing machine, such as a roller, an internal mixer, and a Bambury mixer. The rubber composition is used for tire tread.

The structure of the tread in the present invention is not restricted and any type of tread, such as a single layer tread, a cap/base structure tread and a multilayer tread can be used. The tread can also be divided vertically.

It is known, but not fully how, that the contribution of the tread rubber to the controllability of a tire widely varies depending on viscoelasticity, modulus, and hardness of the rubber and the temperature dependency of these properties. Therefore, the mechanism of the contribution of the polymer and the vulcanization accelerator which are components constituting the present invention and the mechanism of the synergistic effect of combination of these components have not been fully elucidated. The mechanisms may be considered as follows: When a driver intends to change the movement of a vehicle by operation of a steering wheel, an accelerating pedal, or a brake, the forward, backward, leftward, or rightward traction which the driver needs is decided by the ability exhibited by the tire. The tread rubber of a tire is required to have two properties: a stiffness which is sufficient for immediate transfer of an input transferred from the case part of the tire to the face in contact with a road surface; and the property of gripping the road surface in response to the transferred input through deformation of the tread rubber in accordance with the roughness of the road surface and the resultant generation of hysteresis loss.

Therefore, it is important for improvement of high speed controllability that delayed response of the input caused by softening of the tread part at high temperature be prevented and that the hysteresis loss be maintained at a satisfactory level at high temperature.

It is known that hysteresis loss is generated in SBR by the cohesive energy of the styrene unit bound in the molecule. A metal salt of a dithiophosphoric acid tends to form the monosulfide linkage which binds crosslinking points of polymer molecules through a short linkage and provides excellent heat resistance. The amount of the monosulfide linkage is clearly increased when a metal salt of a dithiophosphoric acid is used in an amount of 0.2 parts by weight or more and tends to saturate when a metal salt of a dithiophosphoric acid is used in an amount of about 2 parts by weight. The amount of the monosulfide linkage is not increased any more even when a metal salt of a dithiophosphoric acid is used in an amount exceeding 5 parts by weight. When SBR and a metal salt of a dithiophosphoric acid are used in combination, a heat resistant linkage is formed, and the stiffness is maintained at a satisfactory level at high temperature. When SBR and a metal salt of a dithiophosphoric acid are used in combination, polymer molecules are held close to each other, and the cohesive property of the styrene unit is also maintained at a satisfactory level at high temperature. This means the hysteresis loss is maintained at a satisfactory level at high temperature. Thus, improved controllability at a high temperature which means improved high speed controllability can be obtained. Particularly, when SBR described above is used, it is considered that the cohesive energy of the styrene unit bound in the molecule effectively increases hysteresis loss because the distance between crosslinking points is decreased, and the synergistic effect on the improvement in high speed controllability is exhibited.

EXAMPLES

The invention will be described in more detail with reference to the following examples; however, these examples are not to be construed to limit the scope of the invention.

Various measurements were conducted in accordance with the following methods:

(1) Evaluation of Controllability

To evaluate controllability of tires, a road test was conducted on a proving ground by using a four-door front-wheel-drive sedan on a dry asphalt road surface, and an overall evaluation was made by a test driver on driving property, the braking property, response to steering, and controllability by steering. The test was conducted at average speeds of about 40 km/h and about 80 km/h for evaluation of controllability at medium low, and high speed, respectively.

The results of evaluation are shown by the difference (signs) from controls in terms of plus (+) or minus (−). The results for Comparative Examples 1, 2, 3, and 4, are used as controls for the results in Examples 1, 2, 3, and 4, respectively. The higher the number of pluses (+), the better the property. Plus-or-minus zero (±0) means that the test driver could not distinguish a difference in properties between the test tire and the control. Plus one (+1) means that the property is better than that of the control to the degree that the test driver could detect a slight difference. Plus two (+2) means that the property is better than that of the control to the degree that the test driver could detect a clear difference.

Examples 1 to 4 and Comparative Examples 1 to 4

Components were mixed in accordance with the formulations shown in Table 1. Using the obtained rubber compositions for the tire tread, tires of size 195/60R14 were prepared and evaluated. The results are shown in Table 1.

TABLE 1

| Example             |    | 1   |    | 2  |    | 3   |    | 4  |
|---------------------|----|-----|----|----|----|-----|----|----|
| Comparative Example | 1  |     | 2  |    | 3  |     | 4  |    |
| Formulation (parts by weight) rubber material | | | | | | | | |
| SBR[1)]             | 100 | 100 | 50 | 50 | 100 | 100 | 60 | 60 |
| SBR[2)]             | —   | —   | —  | —  | —   | —   | 55 | 55 |
| natural rubber      | —   | —   | 50 | 50 | —   | —   | —  | —  |

TABLE 1-continued

| Example | 1 | | 2 | | 3 | | 4 | |
|---|---|---|---|---|---|---|---|---|
| Comparative Example | | 1 | | 2 | | 3 | | 4 |
| aromatic oil | 25 | 25 | 25 | 25 | 40 | 40 | 15 | 15 |
| carbon black (ISAF) | 70 | 70 | 70 | 70 | 80 | 80 | 70 | 70 |
| wax | 2.0 | 2.0 | 2.0 | 2.0 | 2.0 | 2.0 | 2.0 | 2.0 |
| antioxidant TMDQ[3] | 0.5 | 0.5 | 0.5 | 0.5 | 0.5 | 0.5 | 0.5 | 0.5 |
| antioxidant IPPD[4] | 1.0 | 1.0 | 1.0 | 1.0 | 1.0 | 1.0 | 1.0 | 1.0 |
| stearic acid | 1.0 | 1.0 | 1.0 | 1.0 | 1.0 | 1.0 | 1.0 | 1.0 |
| zinc oxide | 3.0 | 3.0 | 3.0 | 3.0 | 3.0 | 3.0 | 3.0 | 3.0 |
| accelerator TBBS[5] | 0.5 | 0.5 | 0.5 | 0.5 | 0.5 | 0.5 | 0.5 | 0.5 |
| accelerator MBTS[6] | 0.5 | — | 0.5 | — | 0.5 | — | 0.5 | — |
| accelerator DPG[7] | 0.5 | 0.5 | 0.2 | 0.5 | 0.5 | 0.5 | 0.5 | 0.5 |
| accelerator DIPDPZn[8] | — | 0.7 | — | 0.7 | — | 0.7 | — | 0.7 |
| sulfur | 1.8 | 1.8 | 1.8 | 1.8 | 1.8 | 1.8 | 1.8 | 1.8 |
| total oil | 25 | 25 | 25 | 25 | 40 | 40 | 30 | 30 |
| total styrene content[9] | 23.5 | 23.5 | 11.75 | 11.75 | 23.5 | 23.5 | 28.1 | 28.1 |
| Tire properties | | | | | | | | |
| controllability at medium to low speed | c | ±1 | c | ±0 | c | +1 | c | +1 |
| controllability at high speed | c | +1 | c | +1 | c | +2 | c | +2 |

1) SBR 1500 (styrene content, 23.5% by weight; product of Japan Synthetic Rubber Co., Ltd.)

2) SBR 0120 (styrene content, 35% by weight; 37.5% oil extended; product of Japan Synthetic Rubber Co., Ltd.)

3) TMDQ: polymer of 2,2,4-trimethyl-1,2-dihydroquinoline

4) IPPD: N-isopropyl-N'-phenyl-p-phenylenediamine

5) TBBS: N-t-butyl-2-benzothiazolylsulfenamide

6) MBTS: bis(benzothiazolyl-2)disulfide

7) DPG: diphenylguanidine

8) DIPDPZn: zinc O,O'-diisopropyldithiophosphate

9) % by weight of rubber material c: control

As shown in Table 1, the pneumatic tires of the present invention showed improved controllability both at medium to low speed and at high speed and showed particularly excellent controllability at high speed.

In contrast, as shown by the results of Comparative Examples, the tires prepared by using the rubber compositions not containing the vulcanization accelerator described in the claims of the present invention showed controllability at a high speed inferior to that of the tires in Examples.

(2) Evaluation of Vulcanization Rate

The value of t'90 was measured in accordance with the method of ASTM D2084. The results of evaluation are shown as an index with reference to the value obtained in Example 8, which was set to 100. The smaller the value, the larger the vulcanization rate, i.e., the better the productivity.

Examples 5 to 8

Components were mixed in accordance with the formulations shown in Table 2, and the vulcanization rate of the obtained tread rubber compositions was evaluated. The results are shown in Table 2.

TABLE 2

| | Example 5 | Example 6 | Example 7 | Example 8 |
|---|---|---|---|---|
| accelerator TBBS (parts by weight) | 1.79 | 1.19 | 0.59 | 0 |
| accelerator DIPDPZn (parts by weight) | 0.61 | 1.23 | 1.84 | 2.46 |
| ratio by mol of benzothiazole to zinc dithiophosphate | 6:1 | 2:1 | 2:3 | — |
| t'90 (index) | 60.3 | 57.8 | 68.6 | 100.0 |

| other components of formulation | (parts by weight) |
|---|---|
| 1) SBR 1500 (styrene content, 23.5% by weight; product of Japan Synthetic Rubber Co., Ltd.) | 100.0 |
| 2) ISAF carbon black | 70.0 |
| 3) aromatic oil | 30.0 |
| 4) antioxidant IPPD (refer to Table 1) | 1.0 |
| 5) zinc oxide | 3.0 |
| 6) stearic acid | 1.0 |
| 7) accelerator DPG (refer to Table 1) | 0.5 |
| 8) sulfur | 1.8 |

As shown in Table 2, the vulcanization rate was increased by the combined use of a benzothiazole type vulcanization accelerator and a zinc dithiophosphate in a ratio in the range specified in the present invention. Thus, the pneumatic tire of the present invention can be produced with excellent productivity.

The pneumatic tire of the present invention exhibits an excellent effect of increasing high speed controllability because of the above construction.

What is claimed is:

1. A pneumatic tire comprising a tread layer:

wherein the rubber composition of the tread layer comprises a rubber component containing 50 parts by weight or more of SBR in 100 parts by weight of the rubber component and, in an amount of 0.2 to 2.0 parts by weight per 100 parts by weight of the rubber component, a vulcanization accelerator represented by the following general formula (I):

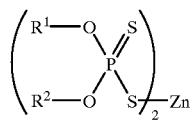

wherein $R^1$ and $R^2$ each independently represents an alkyl group having 1 to 10 carbon atoms which may be linear, branched, or cyclic or an aryl group having 6 to 10 carbon atoms.

2. A pneumatic tire according to claim 1, wherein the vulcanization accelerator represented by general formula (I) is a vulcanization accelerator expressed by any of the following formulae (II):

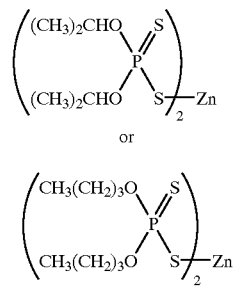

3. A pneumatic tire according to claim 1, wherein the rubber composition comprises 70 parts by weight or more of SBR in 100 parts by weight of the rubber component.

4. A pneumatic tire according to claim 1, wherein the rubber composition comprises SBR in an amount such that the amount of the styrene units in the SBR contained in 100% by weight of the rubber component is 20% by weight or more.

5. A pneumatic tire according to claim 1, wherein the rubber component comprises SBR containing 30% by weight or more of styrene.

6. A pneumatic tire according to claim 1, wherein the rubber composition additionally comprises 20 parts by weight or more of a softener per 100 parts by weight of the rubber component.

7. A pneumatic tire according to claim 6, wherein the rubber composition additionally comprises 25 to 60 parts by weight of the softener per 100 parts by weight of the rubber component.

8. A pneumatic tire according to claim 6, wherein the softener is an aromatic oil.

9. A pneumatic tire according to claim 1, wherein the rubber composition additionally comprises sulfur or a donor of sulfur in an amount of sulfur of 0.5 to 5.0 parts by weight per 100 parts by weight of the rubber component.

10. A pneumatic tire according to claim 1, wherein the rubber composition additionally comprises a vulcanization accelerator containing a benzothiazole unit, and the molar amount of a unit of benzothiazole contained in the rubber composition is half or more of the molar amount of the vulcanization accelerator represented by general formula (I).

11. A pneumatic tire according to claim 10, wherein the vulcanization accelerator containing a benzothiazole unit is at least one compound selected from a group consisting of mercaptobenzothiazoles, dibenzothiazolyl disulfides, benzothiazolylsulfenamides and benzothiazolylsulfenimides.

12. A pneumatic tire according to claim 11, wherein the vulcanization accelerator containing a benzothiazole unit is at least one compound selected from a group consisting of alkylated mercaptobenzothiazoles, bis(alkylated benzothiazolyl)disulfides, alkylated benzothiazolylsulfenamides and alkylated benzothiazolylsulfenimides.

* * * * *